2,752,516

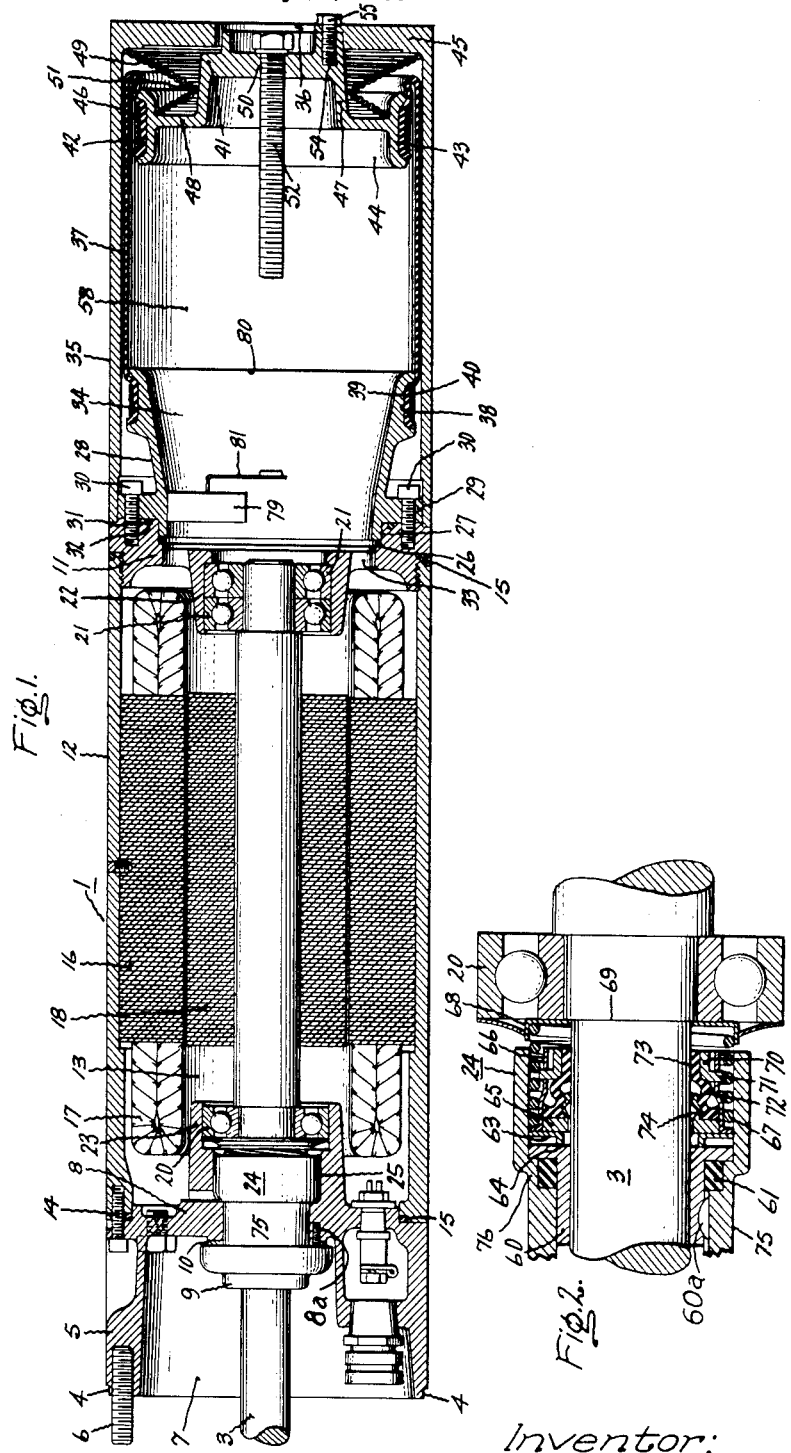

DEEP WELL PUMP MOTOR

Irving Kalikow, Swampscott, Mass., assignor to General Electric Company, a corporation of New York Application July 24, 1953, Serial No. 370,038

3 Claims. (Cl. 310—87)

This invention relates to dynamoelectric machines and more particularly to such machines adapted to be operated while submerged in a liquid as, for example, deep well pump motors.

In certain pumping applications, it is desirable to position the pump impeller and its driving motor adjacent the bottom of the well casing. In this type of construction, the motor is generally arranged below the pump surrounded by the liquid (e. g., water) in the well. In the design of motors for this type of application, it is necessary to provide a sealing arrangement for preventing the well liquid from entering the motor and thus contaminating the motor and possibly short circuiting the motor windings. Complicated shaft seal arrangements have been utilized in the past as, for example, dual seal arrangements including the combination of a running seal and a static seal. However, even the best of these devices is subject to wear and ultimately will allow the liquid to enter the interior of the motor. In other designs, some of the liquid under pressure from the outlet of the pump has been utilized in a pressure seal arrangement to prevent entrance of the liquid from the well. Arrangements of this type, however, have been characterized by their complexity and expensive construction. In addition, motors filled with insulating fluids have been used. In motors of this type, difficulties have been encountered because of the expansion and contraction of the insulating fluid due to the increased temperature of the motor during operation.

It is therefore desirable to provide a submersible motor construction having means providing a positive seal against the entrance of liquid from the well and to provide such a motor in which the sealing arrangement is simple and inexpensive and has a very long life without need for replacement, or other maintenance over a relatively long operating life.

It is an object of this invention to provide an improved submersible motor construction incorporating the desirable features set forth above.

Further objects and advantages of this invention will become apparent and this invention will be better understood by reference to the following description and the accompanying drawing, and the features of novelty which characterize this invention will be pointed out with particularity in the claims annexed to and forming part of this specification.

In accordance with one aspect of this invention, there is provided a motor casing defining a cavity in which the rotor and stator are placed. One end of the rotor shaft extends out of the cavity and a tightly fitted spring biased face-type running seal is mounted on the casing surrounding the shaft to prevent the entrance of well liquid into the cavity. A resilient tubular member is provided having one end attached to the end of the motor casing remote from the shaft opening to form a reservoir in communication with the cavity. The opposite end of the resilient tubular member is closed by a non-porous cup-shaped member. The reservoir and the cavity are completely filled with a suitable insulating fluid, such as oil. Resilient means, such as a helical coil spring, engages the cup-shaped member to exert pressure on the insulating fluid by tending to turn the tubular member inside out. This constant pressure causes any leakage past the seal to be outwardly and thereby prevents well liquid from leaking inwardly past the seal. A very small amount of well liquid may leak inwardly due to the interaction of the two fluids across the running face of the seal. If the well liquid is heavier than the insulating fluid within the motor, it passes to the lowermost portion of the reservoir below the end of the motor windings and consequently is prevented from short circuiting the windings. An alarm system may be provided to indicate when the motor should be removed for refilling with insulating fluid.

In the drawing,

Fig. 1 is a side elevational sectional view illustrating an improved submersible motor construction embodying this invention.

Fig. 2 is a fragmentary sectional view illustrating the shaft seal construction of Fig. 1 in greater detail.

Referring now to Fig. 1, there is shown a submersible pump motor generally identified as 1, it being understood that the motor 1 will ordinarily be vertically arranged in a well casing below the pumping element (not shown) which may be driven by shaft 3. The impeller housing (not shown) may be positioned relative to cylindrical flange 5 of the motor 1 by any suitable means as for example, by means of rabbets mating with the rabbets 4 on the end of flange 5 and secured thereto by studs 6. Flange 5 is provided with an inwardly turned radial wall 8 and defines therewith a cavity 7 which is filled with well liquid when motor 1 is in use. Slinger collar 9, which is secured to shaft 3 to rotate therewith, may be provided to deflect away from shaft 3 any solid matter in the well liquid and to form a reasonably close fitting bearing with bronze sleeve 10 secured to wall 8 by any suitable means, such as screw 8a, to protect the main seal from sand and other foreign matter which may not be deflected away from the shaft 3 by slinger collar 9.

Motor 1 is provided with a second radial wall 11 axially spaced below radial wall 8. An outer cylindrical casing member 12 is secured to the outer periphery of the walls 8 and 11 respectively, and defines cavity 13 therewith. Seal rings 14 formed of a suitable resilient material, such as rubber or neoprene, are arranged in suitable annular grooves 15 formed in outer casing member 12. Seal rings 14 prevent the entrance of well liquid into the cavity 13 between the shell 12 and the end walls 8 and 11 respectively.

A stator member 16 formed of a plurality of laminations of relatively thin magnetic material is non-rotatably secured to casing 12 within cavity 13 and has suitable field windings 17 arranged in winding slots therein (not shown). Rotor 18, shown here as being of the squirrel cage induction type, is positioned within the bore of stator 16 and is mounted on shaft 3.

Shaft 3 is rotatably mounted in suitable bearings 20 and 21 which are in turn positioned in central hubs 22 and 23 of walls 11 and 8 respectively. Bearings 21 also serve to counteract the thrust of the pumping operation.

Seal assembly 24, mounted in seal cavity 25 formed in central hub 23 of wall 8, is positioned above bearing 20. Seal assembly 24, which will hereinafter be more fully described, surrounds shaft to prevent the entry of well liquid into cavity 13. However, since seal assembly 24 alone may not be completely effective in preventing the entry of well liquid into cavity 13, the arrangement now to be described is provided.

End wall 11 of cavity 13 is provided with a suitable annular recess 26 adapted to receive a cylindrical end portion 27 of coupling member 28. Coupling member 28 is secured to end wall 11 by means of screws 30. Annular seal 31, formed of a suitable material such as rubber or neoprene, is arranged in an annular groove 32 in the end of wall 11 to prevent the entrance of well liquid into cavity 13 between coupling member 28 and end wall 11. End wall 11 is perforated by a plurality of openings 33 which provide communication between cavity 13 and zone 34 defined by coupling member 28.

A second casing member 35 of substantially the same diameter as casing member 12 and located in axial alignment therewith, surrounds radial flange 29 of coupling member 28 and terminates at its end remote from casing 12 in an inwardly turned radial flange portion 45 having an opening 36 therein to admit well liquid to its interior. Within casing 35 and shielded thereby is a hollow tubular member 37 formed of a suitable flexible material. While any flexible material can be used I prefer to use rubber or neoprene because of its long wearing qualities. The upper end 38 of tubular member 37 is secured in an annular groove 39 formed in the outer periphery of the cylindrical lower end portion of coupling member 28 and is held in sealed relationship therewith by any suitable means such as banding cord 40. Re-entrant end 42 of tubular member 37 is closed by a cylindrical generally cup-shaped member 41. Re-entrant end 42 is held in sealed relationship with annular groove 43 formed in rim 44 of cup-shaped member 41 by any suitable means such as banding cord 46.

Resilient tubular member 37 defines with member 41, coupling member 28, and wall 11, a fluid reservoir 58 in communication through perforations 33 with cavity 13 of the motor housing.

Cup-shaped member 41 comprises a central hub portion 47 and a radial unperforated web portion 48 connecting rim 44 to hub portion 47. By its configuration the lower end of cup-shaped member 41 defines with radial flange portion 45 of casing 35 a suitable cavity for receiving a coil spring 49. Coil spring 49 is provided with a helix diameter 51 intermediate its ends which is less than the diameter of its ends so that it may be compressed in a short axial length.

To aid seal assembly 24 in preventing the well liquid from leaking from cavity 7 along shaft 3 into motor cavity 13, motor cavity 13 and reservoir 58 are filled with a suitable insulating fluid, and while any such fluid may be used, lubricating oil is preferred. It will readily be seen that as spring 49 tends to expand axially, it exerts pressure on cup-shaped member 41 and tends to turn flexible tubular member 37 inside out, thereby placing the insulating fluid in cavity 13 and reservoir 58 under continuous pressure. Because the well liquid is in communication with the exterior of tubular member 37 through opening 36, the pressure of the insulating fluid is greater than the pressure of the well liquid. Thus the fluid in the interior of the motor will tend to leak slowly outwardly along shaft 3 past seal assembly 24 and thereby prevent the well liquid from entering the motor cavity 13 by leaking in the opposite direction.

Because of the relative size and axial placement of casing 35 with respect to casing 12 and the use of a flexible tubular member as a reservoir for the insulating fluid together with the construction of spring 49 and cup-shaped member 41, this construction provides the maximum available reserve of insulating fluid without increasing the radial space requirements of the motor.

To initially fill cavity 13 of motor 1 and reservoir 58 of tubular member 37, a suitable threaded opening 50 is formed in the bottom of cup-shaped member 41. A bolt 52 is provided to seal this hole when the motor casing has been filled. A bolt 54 having a head 55 which engages the lip of flange 45 is provided to hold spring 49 compressed during the filling operation and during storage before the motor 1 is installed in a well.

At the time the motor is to be installed in a well, bolt 54 is removed permitting spring 49 to exert pressure on the insulating fluid in the motor 1. Since opening 36 in the end of casing 35 permits well liquid pressure to equalize the well liquid pressure applied to cavity 7, the force of spring 49 assures that, at all times, the pressure of insulating fluid in motor 1 is greater than the well liquid pressure in cavity 7 by a constant value, thereby causing any leakage past seal assembly 24 to be outwardly from the motor. It is apparent that this arrangement also automatically compensates for changes in the temperature of the oil as well as changes in the volume required by the oil due to the running of the motor. As the fluid inside the motor leaks outwardly across the seal assembly 24, the spring pressure of spring 49 on cup-shaped member 41 causes tubular member 37 to progressively tend to telescope the lower end of tubular member 27 into the upper end to reduce the combined volume of the cavity 13 and the reservoir 58 to conform to the reduction in the total fluid therein. The volume of reservoir 58 will continue to decrease as the total quantity of insulating fluid is reduced until rim 44 of cup-shaped member 41 comes into contact with the lower end of coupling member 28. Because of the effectiveness of seal 24, as described below, tubular member 37 will become fully collapsed only after a very long operating life.

Because there may be a small amount of well liquid leakage downwardly past seal assembly 24, due to the interaction of the well liquid and the insulating fluid across the running face of the seal zone 34, when rim 44 of cup-shaped member 41 is in contact with the end of coupling member 28, provides a minimum volume to accommodate the collection of this leakage of well liquid at a level below windings 17 to preclude the short circuiting of these windings.

It is desirable to provide means for indicating when the motor should be removed from the well for refilling with insulating fluid. While any suitable means may be used, a hermetically sealed switch 79 secured to coupling member 28 and controlling a circuit to actuate a signal such as a light or buzzer (not shown) above ground is preferred. Switch 79 has a resilient actuator arm 81 which is adapted to be engaged by bolt 52 when rim 44 of closure member 41 closely approaches edge 80 of coupler member 28. The flexibility of actuator arm 81 permits some additional movement of closure member 41 after the signal to refill the motor has been given.

Referring now to Fig. 2, the seal assembly generally referred to as 24 includes a bushing 75 which is non-rotatably secured in wall 8 as by a press fit. A non-rotatable annular collar 60 is positioned within bushing 75 and is axially slidable relative thereto. Collar 60 is secured against rotation by any suitable means such as a key 60a on collar 60 which is positioned in a cooperating keyway on bushing 75. A rubber or neoprene O ring gasket 61 seals collar 60 with respect to bushing 75.

A rotatable annular sealing member 63 is provided with a sealing face 64 adapted to engage the lower surface of collar 60 to provide a face type running seal to prevent the entry of liquid into the motor. Sealing member 63 is urged upwardly against collar 60 by spring 67. Spring 67 also serves to compress O ring 61 to assure a tight seal between collar 60 and bushing 75.

Immediately below and connected to ring 63 is an annular ring 65 terminating at its lower end in a portion which is S-shaped in cross section. Also connected to rotatable sealing member 63 and within the annular space between shaft 3 and the downwardly depending skirt portion of bushing 75 is a generally cylindrical downwardly depending rotatable member 66. A solid clamping ring 70 is positioned radially inwardly from cylindrical member 66 and is non-rotatably secured thereto by means of ears 71 extending in axial slots of cylindrical member 66. Resilient sealing member 72 having a serpentine cross section and formed of any suitable resilient material, such as rubber or neoprene, has its lower end 73 positioned radially inwardly from solid clamping ring 70. The thickness of resilient sealing member 73 is such that clamping member 70 exerts a compressive force on the lower end 73 of the resilient sealing member 72 to provide a positive seal between clamping ring 70 and shaft 3. The upper end 74 of resilient sealing member 72 is compressed between cylindrical member 66 and the S-shaped lower end of ring 65 to form a positive seal therebetween. It will be observed that due to the serpentine shape of resilient seal member 72, the distance between the ends 73 and 74 thereof may be increased axially without breaking the sealing surfaces thereof.

It will thus be seen that spring 67 exerts a force urging sealing member 63 upwardly against the face of stationary annular flange 60 to produce a face type running seal separating cavity 7 containing well liquid from cavity 13 containing insulating fluid. It is desirable to fabricate annular flange 60 of a high quality steel which has a highly accurate and polished lower sealing face presented to member 63. The rotatable sealing member 63 is preferably made of a highly polished carbon or carboloy material, or a high quality highly polished steel so that its running face 64 exactly matches the cooperating face of annular collar 60 and is held in contact therewith at all points of its working surface under the urging of spring 67. An accurate sealing means, such as this, is desirable between the shaft and the wall 8 to reduce to the minimum the leakage of insulating fluid between cavity 13 and cavity 7.

From the foregoing it will be seen that this invention provides an improved fluid filled submersible motor construction wherein a high quality running seal is combined with a reservoir containing a reserve supply of insulating fluid and biasing means to replace the insulating fluid lost by controlled leakage past the seal from the motor cavity, because of a positive pressure differential relatively to the pressure of the well liquid. It will further be seen that zone 34 formed by coupling member 28 provides a minimum volume to collect any well liquid which works past the seal into cavity 13 by interaction with the insulating fluid across the running face of the seal. Collection zone 34 assures that water which may enter the motor casing will be retained at a lower level than the motor windings and therefore cannot result in a short circuit of these windings.

While there is shown and described a specific embodiment of this invention, further modifications and improvements thereof will occur to those skilled in the art. Therefore, it should be understood that this invention is not limited to the form shown and the appended claims are intended to cover all modifications which do not depart from the spirit and scope of this invention.

What I claim as new and desire to secure by Letters Patent of the United States is:

1. A submersible motor comprising a pair of spaced apart apertured end walls, a first casing connecting said end walls and defining a cavity therewith, a rotor mounted on a shaft within said cavity, said shaft extending through an aperture in one of said end walls, sealing means on said end wall adjacent said aperture and surrounding said shaft for sealing said shaft with respect to said end wall to prevent the entrance of external liquid into said cavity, a second casing secured to the other of said end walls in axial alignment with said first casing, a coupling member extending downward from said first casing, a flexible tubular member providing a fluid reservoir positioned within said second casing and having a first end secured to the lower end of said coupling member and a free re-entrant end, a cylindrical closure member spaced inwardly from said second casing to define a peripheral gap therewith for closing said re-entrant end, said fluid reservoir communicating with said cavity through the other said end wall and adapted to be filled with an insulating oil, a spring in said second casing engaging said closing means to exert a force tending to telescope the lower end of said tubular member into its upper end to place said fluid under continuous pressure and tending to cause the same to leak outwardly past said sealing means, said coupling member serving to limit the upward movement of said closure member to provide a minimum volume below the first casing to collect any external liquid entering the motor.

2. A submersible motor comprising a pair of apertured spaced apart end walls, a first casing connecting said end walls and defining a cavity therewith, a rotor mounted on a shaft within said cavity, said shaft extending through the aperture in one of said end walls, sealing means on said end wall adjacent said aperture and surrounding said shaft for sealing said shaft with respect to said end wall to prevent the entrance of external liquid into said cavity, a second casing secured to the other of said end walls, a flexible tubular member providing a fluid reservoir positioned within said second casing and having a re-entrant end, means for closing the re-entrant end of said tubular member, said reservoir commuicating with said cavity through the aperture in said other end wall, said cavity and said reservoir being adapted to be filled with an insulating oil, a coil spring in said second casing engaging said closing means to exert a force tending to telescope the lower end of said tubular member into its upper end for placing said fluid under continuous pressure and tending to cause the same to leak outwardly through said sealing means, a switch having a resilient actuating arm for operating a signal, and means carried by said closure member for engaging said resilient arm to operate said switch when said closure means advances to a predetermined distance from said other end wall, said resilient arm being effective to provide for the further advance of the closure member after the signal has been operated.

3. A submersible motor as recited in claim 2 wherein said coil spring is provided with a helix diameter intermediate its ends which is less than the helix diameter at its ends so that it may be compressed to a minimum axial length to provide the maximum fluid supply in said reservoir.

References Cited in the file of this patent

UNITED STATES PATENTS

| 2,301,340 | Spengler | Nov. 10, 1942 |
| 2,703,371 | Wightman | Mar. 1, 1955 |

FOREIGN PATENTS

| 159,862 | Great Britain | Mar. 30, 1922 |